United States Patent [19]
Lipo et al.

[11] Patent Number: 5,841,644
[45] Date of Patent: Nov. 24, 1998

[54] PASSIVELY CLAMPED QUASI-RESONANT DC LINK CONVERTERS

[75] Inventors: Thomas A. Lipo, Middleton; Shaotang Chen, Madison, both of Wis.

[73] Assignee: Electric Power Research Institute, Inc., Palo Alto, Calif.

[21] Appl. No.: 711,674

[22] Filed: Sep. 4, 1996

[51] Int. Cl.$^6$ .................................................. H02M 5/45
[52] U.S. Cl. ................................ 363/37; 363/98; 363/132
[58] Field of Search ................................... 393/35, 37, 51, 393/96, 132, 97, 98

[56] References Cited

U.S. PATENT DOCUMENTS

| | | | |
|---|---|---|---|
| 4,477,686 | 10/1984 | Steigerwald | 363/28 |
| 4,730,242 | 3/1988 | Divan | 363/37 |
| 4,788,635 | 11/1988 | Heinrich | 363/35 |
| 4,833,584 | 5/1989 | Divan | 363/37 |
| 4,864,483 | 9/1989 | Divan | 363/37 |
| 4,942,511 | 7/1990 | Lipo et al. | 363/136 |
| 4,965,709 | 10/1990 | Ngo | 363/37 |
| 5,038,267 | 8/1991 | De Doncker et al. | 363/89 |
| 5,251,119 | 10/1993 | Maehara | 363/37 |
| 5,307,004 | 4/1994 | Carsten | 323/222 |
| 5,483,140 | 1/1996 | Hess et al. | 318/802 |
| 5,502,628 | 3/1996 | Arakawa | 363/20 |
| 5,594,634 | 1/1997 | Rajashekara et al. | 363/98 |

OTHER PUBLICATIONS

Jin He and Ned Mohan, "Parallel Resonant DC Link Circuit—A Novel Zero Switching Loss Topology with Minimum Voltages Stresses"; presented at the 1989 20$^{th}$ Annual IEEE Power Electronics Specialists Conference; 1989; Catalog No. 89CH2721–9; pp. 1006–1012.

Jung G. Cho, Hack S. Kim and Gyu H. Cho, "Novel Soft Switching PWM Converter Using a New Parallel Resonant DC–Link"; presented at the 22$^{nd}$ Annual IEEE Power Electronics Specialists Conference; 1991; Catalog No. 91CH3008–0; pp. 241–247.

R.W. De Doncker and J.P. Lyons, "The Auxiliary Quasi–Resonant DC Link Inverter"; presented at the 22$^{nd}$ Annual IEEE Power Electronics Specialists Conference; 1991; Catalog No. 91CH9008–0; pp. 248–253.

L. Malesani, P. Tenti, P. Tomasin and V. Toigo, "High Efficiency Quasi Resonant DC Link Converter for Full–Range PWM"; presented at the Seventh Annual Applied Power Electronics Conference and Exposition; Feb. 23–27, 1992; Catalog NO. 92CH3089–0; pp. 472–478.

Jong Woo Choi and Seung Ki Sul; "Resonant Link Bidirectional Power Converter Without Electrolytic Capacitor"; presented at the 24$^{24}$ Annual IEEE Power Electronics Specialists Conference; 1993; Catalog No. 93CH3293–8; pp. 293–299.

Mustansir H. Kheraluwala, Donald W. Novotny and Deepakraj M. Divan; "Coaxially Wound Transformers for High–Power High–Frequency Applications"; IEEE Transactions on Power Electronics; vol. 7, No. 1; Jan. 1992.

Shaotang Chen, Braz J. Cardoso Filho and Thomas A. Lipo, "Design and Control of Passively Clamped Quasi Resonant DC Link Inverter"; research work has been sponsored by WEMPEC and CNPq., Brazil.

(List continued on next page.)

*Primary Examiner*—Peter S. Wong
*Assistant Examiner*—Derek J. Jardieu
*Attorney, Agent, or Firm*—Leonard Bloom

[57] ABSTRACT

A passively clamped quasi-resonant DC link ("PCQRL") converter includes an output inverter having a plurality of switches, and a DC link between a DC power source and the output inverter. The DC link is realized by a clamp transformer having a clamp factor not higher than 1.1–1.3 and a small auxiliary inductance which is switched by a pair of auxiliary switches (driven by the same gating signal) and a pair of diodes. When the auxiliary switches are turned "ON", the DC link voltage drops to zero; and the switches of the output inverter then can be switched under zero voltage condition with no switching losses. Most of the modulation schemes, including PWM, are applicable to the DC link design.

11 Claims, 15 Drawing Sheets

OTHER PUBLICATIONS

D.M. Divan, "The Resonant DC Link Converter—A New Concept in Static Power Conversion", 1986; pp. 648–656.

Mark S. Rauls, Donald W. Novotny and Deepakraj M. Divan, Design Considerations for High Frequency Co–Axial Winding Power Transformers; Research Report 91–6; Wisconsin Electric Machines & Power Electronics Consortium; Jun. 14, 1991.

Shaotang Chen and Thomas A. Lipo, "Soft–Switched Inverter for Electric Vehicle Drives"; Research Report 95–02; Wisconsin Electric Machines & Power Electronics Consortium; Jan. 1995.

Shaotang Chen and Thomas A. Lipo, "A Passively Clamped Quasi Resonant DC Link Inverter"; Research Report 94–31; Wisconsin Electric Machines & Power Electronics Consortium; Jun. 1994.

Yoshihiro Murai and Thomas a. Lipo, "High Frequency Series Resonant DC Link Power Conversion", Research Report 88–16; Wisconsin Electric Machines & Power Electronics Consortium; Jun. 1988.

D.M. Divan, S. Bhattacharya and G. Luckjiff; "Design Trade–Offs in Soft Switching Inverters"; Research Report 92–3; Wisconsin Electric Machines & Power Electronics Consortium; Mar. 1992.

Shaotang Chen, Braz J. Cardoso Filho and Thomas A. Lipo; "Design and Implementation of a Passively Clamped Quasi Resonant DC Link Inverter"; presented at the Thirtieth IAS Annual Meeting of the 1995 IEEE Industry Applications Conference at Orlando, Florida, USA; Oct. 8–12, 1995.

Gary Leonard Skibinski; "The Design and Implementation of a Passive Clamp Resonant DC Link Inverter for High–Power Applications"; UMI Dissertation Services; 1992.

PASSIVELY CLAMPED QUASI-RESONANT DC LINK CONVERTERS

FIELD OF THE INVENTION

The present invention relates to a soft switched converter for electrical power conversion, and more particularly, to a passively clamped quasi-resonant DC link ("PCQRL") converter with a reduced clamp factor and capable of pulse-width modulation ("PWM").

BACKGROUND OF THE INVENTION

Soft switched topologies for electrical power conversion have brought new perspectives to high performance converters. In recent years, various soft switched voltage source inverters ("VSI's") and current source inverters ("CSI's") have been intensively studied for use in high performance drive applications for their exceptional advantages. The elimination of switching losses in a soft switched inverter overcomes some physical limitations of a transistor switch, thereby providing a higher switching frequency, low dv/dt and di/dt stresses in the power devices, and reduction in electro-magnetical interferences.

It is known, for soft switched VSI's, the resonant DC link inverter possesses the simplest structure and adds only an inductor and a capacitor to a hard switched DC link VSI. However, as the inverter impresses substantial voltage stress (about 2.5 per unit) across the devices, the actively clamped resonant DC link ("ACRL") inverter has been proposed to limit the device voltage stress to 1.3–1.5 per unit.

The active clamp, however, also gives rise to a number of problems. Firstly, a "per cycle" charge balance of the clamp capacitor is required to sustain link oscillation. That is, losses in the resonant components and the clamp switch have to be anticipated and compensated by storing sufficient initial current in the inductor, which, in turn, pumps excessive charge into the clamp capacitor. The excessive capacitor charge needs to be regulated in order to maintain a constant clamp factor and to ensure that the link voltage returns to zero. The regulation requires a precise control of the clamp switch which is sensitive to the error of the current sensor or observer. The link resonance therefore becomes difficult to maintain over all operating conditions because a precise current sensor is not available or the current observer becomes easily detuned by link inductance variation. Per cycle charge balance of the clamp capacitor also prevents large width variation of link voltage pulses from cycle to cycle, which necessitates the use of delta modulation ("DM") to synthesize the output waveform. To produce the same spectrum quality, the switching frequency must be 4 to 5 times higher than a hard switched PWM strategy. High link frequency can elevate the clamp factor and worsen the losses in the active clamp circuit, especially at high power level. As a result, the ACRL inverter is limited to a power level below 50 kW.

U.S. Pat. No. 4,730,242 discloses a static power converter having zero switching losses and including a resonant DC link between a DC source and a variable frequency voltage source inverter. The resonant DC link is composed of an inductor and capacitor and is resonated in complete half cycles. The switching instants are dictated when the link voltage crosses through zero, i.e., it is a function of the parameters of the DC link and cannot be changed. The link voltage is not limited but rises to 2 per unit.

U.S. Pat. No. 4,864,483 is an extension of the previous '242 patent which solves the problem of the 2 times per unit voltage rating of the output inverter switches by using an active clamp which is set to limit the link voltage to about 1.4 per unit. Since the switch switches at roughly 6 times the frequency of the output inverter switches, it is highly stressed. This '483 patent involves a circuit in which complete half cycles of high frequency voltage appear across the output inverter terminals. Hence, the length of the pulses cannot be controlled with this circuit.

The need for simple resonance control, PWM capability and lower device stresses therefore becomes an important issue for widespread application of a soft switched inverter. The auxiliary commutated resonant pole (ACRP) inverter (discussed in R. W. DeDoncker, and P. J. Lyons, "The Auxiliary Resonant Commutated Pole Converter", IEEE-IAS Annual Conference Record, 1990, pp. 1228–1235) possesses these desired features. However, the circuit requires six extra switches and three additional inductors to accomplish the soft switching. Hence, it is attractive only for a power rating more than 200 KW where cost vs. performance can be justified.

Recently, the quest has led to a parallel resonant DC link structure, which has lately evolved to several topologies nominally referred to as the quasi-resonant DC link ("QRL") inverter (as discussed in T. G. Cho, H. S. Kim and G. H. Cho, "Novel Soft Switching PWM Converter Using A New Parallel Resonant DC-Link", IEEE-IPESC, 1991, pp. 241–247; and R. W. DeDoncker and T. P. Lyons, "The Auxiliary Quasi-Resonant DC Link Inverter", IEEE-Power Electronics Specialists Conference, 1991).

Unlike the ACRL, a QRL inverter connects its LC tank in parallel with the DC voltage source. Due to the parallel structure, the resonant tank is minimally involved with power transfer, and the resonant circuit is activated only during the resonant transient. PWM capability becomes a true reality, and the device voltage ratings never exceed 1 per unit. However, the soft switching relies on a main resonant switch inserted between the DC voltage source and the resonant link. The switch has to withstand all three phase load currents and work at high switching frequency, usually several times the switching frequency of the main inverter switch, to ensure resonant transition in all three phases. This is apparently not attractive for practical high power applications because the losses in the main resonant switch are much higher than the active clamp switch in the ACRL. Thus, no higher power handling capability than the ACRL is expected.

U.S. Pat. No. 4,965,709 discloses a switching converter with a pseudo-resonant DC link for coupling direct current from a DC source to an output inverter. The DC link includes a capacitor and an inductor coupled through controllable switches controllable in a manner that momentarily reduces to zero the input voltage to the inverter each time that a switch in the inverter is commutated. The controllable switches in the DC link function to allow the capacitor to resonate through the inductor and then be re-charged at the end of a commutation interval. Disadvantageously, the controllable switches of the DC link include three thyristors (or transistors) and three diodes, thus making the circuit expensive. Besides, the first controllable switch in series between the DC power input and the inverter input terminals has to withstand all phase load currents and work at high switching frequency to insure resonant transition in all three phases, a severe disadvantageous for high power applications.

Therefore, a suitable resonant link converter able to handle power ratings up to 200 kW (and having a reasonable cost) is still needed. Although the passively clamped resonant DC link (PCRL) topology has been built with a 200 kW capacity (discussed in G. Skibinski, "The Design and Implementation of a Passive Clamp Resonant DC Link Inverter for High Power Application", Ph.D. Thesis, University of Wisconsin-Madison, 1992), its requirement for a device voltage rating of more than 2 per unit must clearly be removed before gaining any practical attention.

BRIEF SUMMARY OF THE INVENTION

It is, therefore, the object of the present invention to provide a soft switched converter with a low clamp factor (as low as 1.1–1.3 per unit), simple resonant control, guaranteed zero link voltage conditions and PWM capability, the soft-switched converter having definite advantages and being free of the deficiencies of the soft switched converters of the prior art.

It is another object of the present invention to provide a novel passively clamped quasi-resonant DC converter (PCQRL) having a quasi-resonant DC link and capable of operating at a high power level up to 200 kW, and wherein the problem with high voltage stress is solved and the PWM operation and resonant control is easily fulfilled.

It is still another object of the present invention to provide a PCQRL converter having a clamp transformer with a minimized leakage inductance.

It is yet another object of the present invention to provide a method for controlling the operation of the PCQRL converter according to the link operation requirements.

According to the teachings of the present invention, a DC to AC converter includes an inverter having a plurality of controllable switches and a quasi-resonant DC link connected between a DC power source and the inverter. The DC link brings the link voltage to zero prior to switching (turning off) switches in the inverter. The switching instants are chosen by gating switches in the DC link. The length of the pulse applied to a load (which may be, for instance, a multi-phase inductance machine) is variable and the end of the pulse defined by the time in which the transistors are gated. At that point resonance occurs, the link voltage is brought to zero, and the switches of the inverter are switched. After this, the next pulse interval begins.

The quasi-resonant DC link comprises a clamp transformer—which is an important feature of the converter of the present invention, and which allows for a means to limit the voltage excursion on the switches of the inverter— including a primary magnetizing inductance connected in series with the DC power source and serving as a resonant inductance and a secondary connected in parallel to the DC power source and serving as a clamp winding.

The leakage inductance of the clamp transformer is reduced by means of either a co-axial arrangement of the primary and secondary wires, or by so-called winding splitting technique.

In order to reach a clamp factor not higher than 1.2, the turns ratio of the clamp transformer is 1:5.

A capacitor is connected to the input terminals of the inverter.

Preferably, an auxiliary inductance is switched by a pair of auxiliary switching means. The first auxiliary switching means is connected between the second end of the auxiliary inductance and the first input terminal of the output inverter. The second auxiliary switching means is connected between the first end of the auxiliary inductance and the second input terminal of the output inverter.

A first auxiliary diode is connected in opposite parallel arrangement with the first auxiliary switching means between the first end of the auxiliary inductance and the first input terminal of the output inverter. The second auxiliary diode is connected in opposite parallel arrangement with the second auxiliary switching means between the second end of the auxiliary inductance and the second output terminal of the output inverter.

The first and second auxiliary switching means are driven by the same gating signal. Once the inverter switching has been commanded, the first and second auxiliary switching means are turned "ON" to initiate a resonant transient and to cause a link zero-voltage condition, and the switching command is accomplished in precise synchronization with the link zero-voltage condition.

All gatings (switchings) in the converter are controlled by a controller which comprises a command generator for each phase of the multi-phase load, and a plurality of logic bi-stable units (flip-flops) each of which receives commands from a respective one of the command generators and is connected to the inverter switches of the respective phase. Preferably, an edge detector detects the desired state change before the switching command is passed to the inverter switches of the respective phase and triggers the "Turn-ON" of the auxiliary switching means (either one of them or both) once the desired state change has been detected. Once a link zero-voltage detector detects the link zero-voltage condition, it outputs the signal to a respective one of the plurality of logic bi-stable units, thereby synchronizing the switching command with the link zero-voltage condition to ensure zero-voltage switching.

In another implementation, a number of the auxiliary switches in the DC link is reduced to one, and the same magnetic core is utilized for the auxiliary inductance and the primary winding of the clamp transformer.

In still another implementation of the present invention, the secondary of the passive clamp transformer is replaced by a low voltage DC source and a clamp diode.

These and other objects of the present invention will become apparent from a reading of the following specification taken in conjunction with the enclosed drawings.

DESCRIPTION

Figure 1:
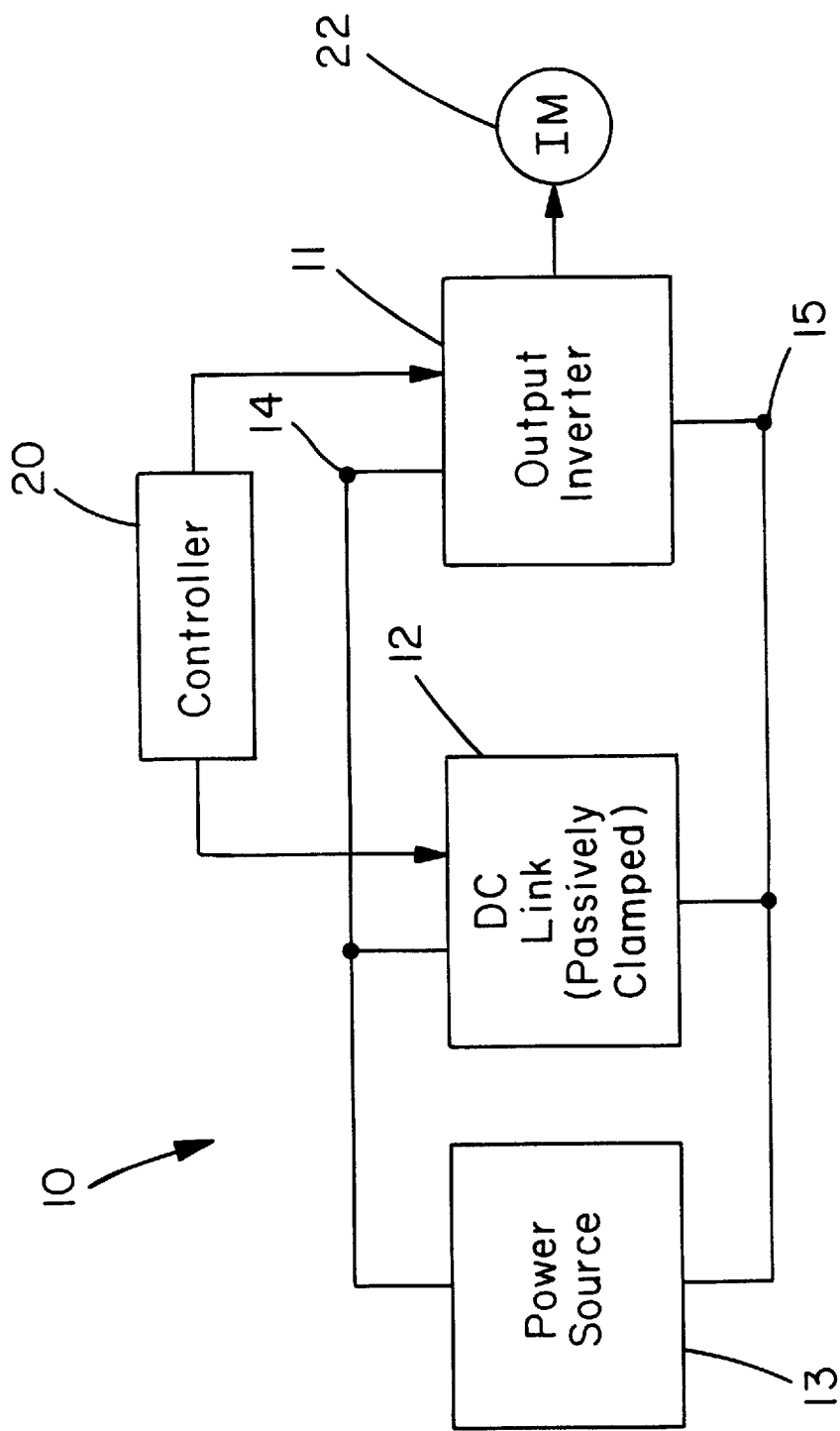
FIG. 1 is a simplified block diagram of a DC to AC converter of the present invention.
Figure 2:
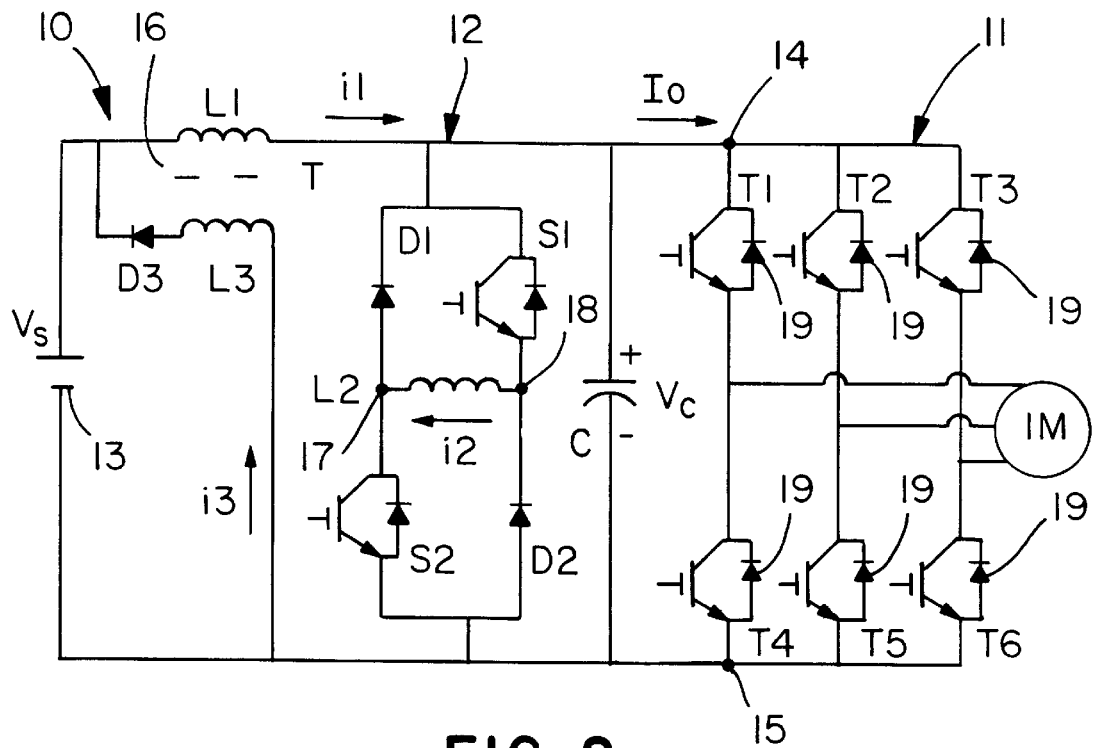
FIG. 2 is a simplified schematic diagram of a DC to AC converter of the present invention.

Referring to FIGS. 1 and 2, a DC to AC converter 10 comprises an output inverter 11 and a quasi-resonant passively clamped DC link 12 which transfers DC power from a DC power source 13 to input terminals 14, 15 of the output inverter 11.

The DC link 12 comprises a small auxiliary inductance $L_2$, a pair of auxiliary switches $S_1$, and $S_2$, a pair of auxiliary diodes $D_1$ and $D_2$, a conductor C and a clamp transformer 16.

The clamp transformer 16 includes a primary magnetizing inductance (primary) $L_1$ serving as the resonant inductance and a secondary $L_3$, serving as the clamp winding.

As best shown in FIG. 2, the primary $L_1$ is connected in series between the DC power source 13 and the input terminal 14 of the output inverter 11, while the secondary $L_3$ is connected in parallel to the DC power source 13 and to the input terminals 14, 15 of the output inverter 11.

The auxiliary switch $S_1$ is connected between the input terminal 14 and an end 18 of the auxiliary inductance $L_2$, while the auxiliary switch $S_2$ is connected between an end 17 of the auxiliary inductance $L_2$ and the input terminal 15 of the output inverter 11. Each auxiliary switch, $S_1$ and $S_2$, includes either a transistor or thyristor connected in a parallel opposite arrangement with a diode.

The auxiliary diode $D_1$ is connected in opposite parallel arrangement to the auxiliary switch $S_1$ between the input terminal 14 of the output inverter 11 and the end 17 of the auxiliary inductance $L_2$; another auxiliary diode $D_2$ is connected between the end 18 of the auxiliary inductance $L_2$ and the input terminal 15 of the output inverter 11.

It is important that the clamp transformer 16 has a turn ratio 1:5 in order to reach a clamp factor not higher than 1.2. To ensure clamping, the leakage inductance of the clamp transformer 16 must be minimized.

Figure 5:
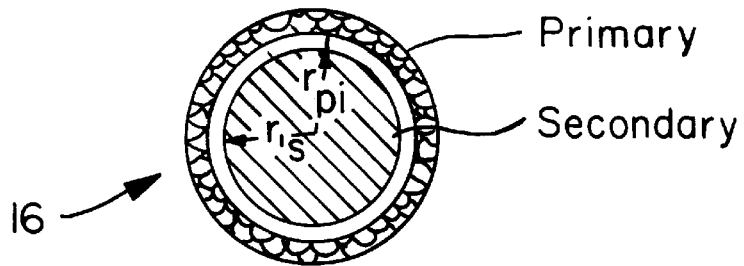
FIG. 5 shows somewhat schematically a cross-section of the co-axial arrangement of the primary and secondary windings of the clamp transformer for reducing the leakage inductance.

The first approach to reduce the leakage inductance is through the design of the coaxial winding cross section. For a coaxial coil cross section, as best shown in FIG. 5, the leakage inductance in the primary $L_1$ (outer wire) is theoretically equal to zero, while the leakage inductance in the secondary $L_3$ (inner wire) equals to $$L_{leak} = \frac{N_s^2 \mu_o}{8\Pi} \left[ 1 + 4 \ln\left(\frac{r_{pi}}{r_s}\right) \right] H/m \qquad (1)$$

where $r_{pi}$ is the inner radius of the primary braided litz wire (outer conductor), $r_s$ is the radius of the secondary litz wire, and $N_s$ is the number of the secondary $L_3$ turns. Therefore, to minimize the leakage, it is desirable to minimize the space between the inner and outer wires.

Figure 6:
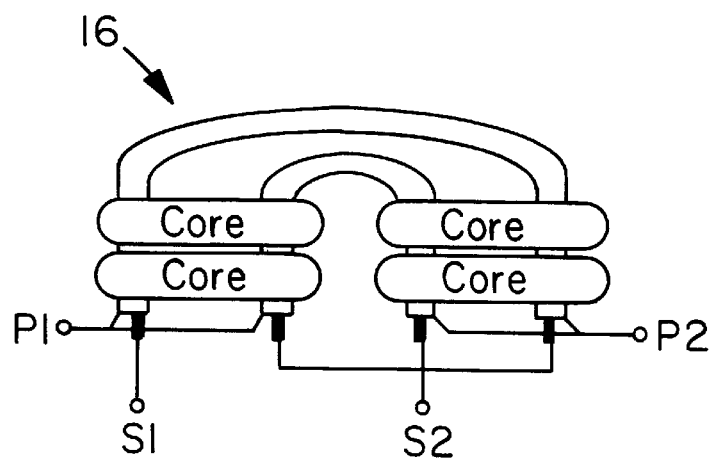
FIG. 6 shows somewhat schematically a winding splitting arrangement of the primary and secondary windings of the clamp transformer.

The second approach to control leakage is based on the so-called winding splitting technique (best shown in FIG. 6).

As will be appreciated by those skilled in the art, the assumption is made that a single coaxial winding has a secondary leakage inductance equal to $L_{ls}$. Instead of using a large single coaxial winding, one can split this single coaxial winding into n electrically insulated sub-coaxial windings and then connect, respectively, the primary terminals and secondary terminals of all sub-coaxial windings in parallel. The current carrying capability and the winding inductance will remain the same. However, the total leakage inductance is reduced to $L_{ls}/n$. This result is due to the fact that there is no mutual leakage inductance between any two sub-coaxial windings. Thus, when all windings are connected in parallel, all leakage inductances are simply in parallel which yields a total leakage inductance equal to $L_{ls}/n$.

Figure 7:
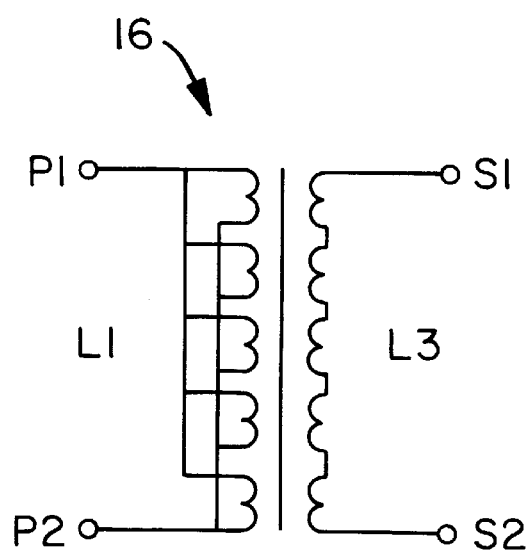
FIG. 7 shows, somewhat schematically, a winding connection for a 1:5 turn ratio of the clamp transformer.

The same technique applies to the leakage reduction in the design of a clamp transformer with a turns ratio of 1:5. For a split winding configuration as shown in FIGS. 6 and 7, if all the primary terminals of each sub-coaxial winding are connected in parallel while all the secondary terminals are connected in series, a 1:5 turn ratio will be produced. Assuming that the secondary leakage inductance in each coil shown in FIG. 6 equals to $L_{ls}$, the total secondary leakage inductance of the clamp transformer assembly is equal to $5L_{ls}$. However, by referring to the primary the total leakage becomes equal to $L_{ls}/5$. For the inverter clamp transformer, the measured leakage inductance from the primary is less than 80 nH; this is sufficiently small to produce a good clamping effect.

The DC link parameter $L_1$, $L_2$ and C are calculated based on the specification of the link waveform parameters such as dv/dt and di/dt. Although there are many choices for link parameters to satisfy the waveform requirements, an optimal solution is preferred in the sense that only minimum resonant energy should circulate inside the inverter to achieve soft switching. The theoretical background has been addressed in the paper S. Chen and T. A. Lipo "A Passively Clamped Quasi Resonant DC Link Inverter", IEEE IAS Annual Conf. Rec., 1994, pp. 841–848. For a 320 V DC bus and a clamp factor of 1.2, a reasonable design of resonant link parameters is shown in Table 1. These parameters lead to peak currents in inductors $L_1$ (AC component) and $L_2$ equal to 29.0 A and 28.5 A, respectively.

TABLE 1

DC Link Parameters

Figure 8:
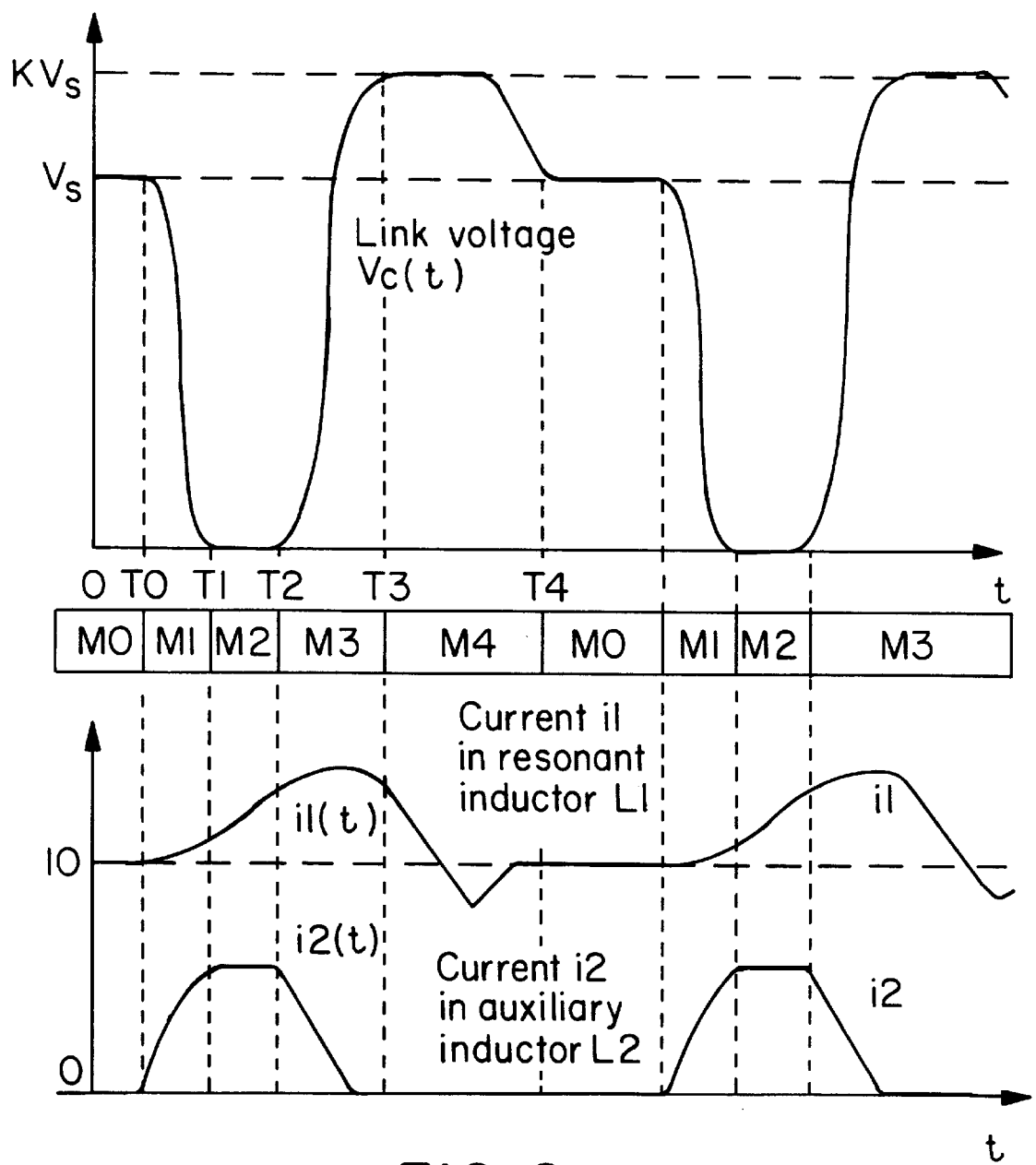
FIG. 8 is a graph showing the operative principles of the present invention.

Clamp transformer:

turns ratio 1:5
primary magnetizing inductance    $L_1$   29.5 $\mu$H
secondary inductance    $L_3$  737.5 $\mu$H
leakage inductance measured from primary 80 nH
Inductor $L_2$   14.3 $\mu$H
Capacitor C   60.0 nF The operation of the DC to AC converter 10 is illustrated in FIG. 8. Since the resonant transient occurs during a very short period of time, the DC link load current can be assumed to be constant during resonant transition.

Five operation modes can be identified. The mode $M_o$ corresponds to the pseudo-steady state conditions with link voltage $V_c(t)$ equal to $V_s$ (the voltage of the DC power source 13) and the inductance $L_1$ current equal to DC link load current $I_o$. When the auxiliary switches $S_1$ and $S_2$ are turned "ON" in a zero current switching manner as a consequence of a switching command according to a modulation strategy adopted (discussed below), the converter 10 enters the mode $M_1$. During the mode $M_1$, the resonance between $L_1$, $L_2$ and C drives the DC link voltage $V_c$ toward a negative value. Mode 2 starts when the DC link voltage $V_c$ reaches zero, and the DC link voltage $V_c$ is clamped to zero by anti-parallel diodes 19 of the output inverter 11 switches $T_1$–$T_6$.

The state of the output inverter switches $T_1$–$T_6$ can be changed under zero-voltage condition. After the switches $S_1$ and $S_2$ are turned "OFF" in a zero-voltage switching manner, and the sequence proceeds to the mode $M_2$, the DC link voltage $V_c$ is raised towards $2V_s$ until it hits the clamped voltage $V_c(t)=K \cdot V_s$, while the current $i_2$ through the auxiliary inductance $L_2$ decays to zero. The clamping mode $M_4$ corresponds to the clamp period during which time a diode $D_3$ coupled to the secondary $L_3$ of the clamping transformer 16 conducts, and the excessive energy in the primary inductance $L_1$ is fed back to the DC power source 13. After the clamping interval, the link returns to the pseudo-steady state $M_o$ and the cycle repeats to the next switching command.

It will be appreciated that the following pattern for control the DC link 12 will provide the desired operation of the converter 10:

Mode 0: Pseudo-Steady State (S1 and S2 off, D1 and D2 off)

In mode 0, the link voltage is clamped at $V_s$. Auxiliary inductor L2 is reset to zero current condition and the auxiliary switches S1 and S2 are off. The current $i_1$ of inductor $L_1$ is equal to the DC link load current $I_o$ and current $i_2$ in inductor $L_2$ is zero. These conditions represents the pseudo-steady state after a resonant transition. In this mode, the resonance between $L_1$ and C is disabled and the pseudo-steady state remains as long as the auxiliary switches S1 and S2 are off.

Mode 1: Link Voltage Ramp-Down (S1 and S2 on, D1 and D2 off)

Whenever a PWM switching command is generated, the auxiliary switches S1 and S2 are turned on first in a zero current switching (ZCS) manner to initiate a resonant transition. The link voltage Vc will force a current $i_2$ increase in the inductor L2, that makes the capacitor C discharge and in the meanwhile triggers the resonance between L1, L2 and C. The link voltage starts to ramp down that is indicated as mode 1. The waveforms are easily explained by observing that when S1 and the S2 are turned on, the load current does not change and the current $L_1$ in the inductor $L_1$ cannot increase rapidly so that the capacitor dumps its energy into the inductor $L_2$. The resonance causes discharge of the capacitor voltage towards zero or negative values.

Mode 2: Zero Link Voltage (S1 and S2 on, D1 and D2 on, $V_c$=0)

After the link voltage drops to zero, mode 2 is entered. The link voltage $V_c$ is then clamped at zero by the anti-parallel connected diodes 19 in the inverter switches. As long as S1 and S2 remain closed, this zero link voltage will be maintained. The inverter switches $T_1$–$T_6$ can then perform the required soft switching during mode 2. At zero link voltage, the current in inductor $L_2$ cannot change, while current in $L_1$ will increase linearly to store sufficient energy for link voltage ramp-up in the next mode. After the inverter poles finish the switching as a PWM modulation commanded, switches S1 and S2 are turned off in a zero voltage switching (ZVS) manner and the link proceeds into mode 3.

Mode 3: Link Voltage Ramp-Up (S1 and S2 Off, D1 and D2 on)

Mode 3 is exactly the same as the link ramp-up process of a conventional resonant circuit if we consider that the cathode of diode D1 is connected to DC voltage source Vs instead of Vlk. In this situation, the current $i_2$ in auxiliary inductor L2 is drained back to Vs, and the resonance between L1 and C will drive the link voltage towards 2Vs until it hits the clamped voltage $Kv_s$. When link voltage reaches $Kv_s$, the clamp transformer 16 forces the excessive energy or current feedback to $V_s$ and clamps the voltage Vc at the desired value $Kv_s$. At this stage the link will remain at the clamped voltage, and current in inductor $L_1$ will supply the steady state DC link load current. The inverter goes back to steady state mode 0.

Mode 4: Clamped Period ($S_1$ and $S_2$ off, $D_3$ on)

It is important to note that when the diode D1 is connected to $V_{lk}$ instead of the link $V_s$, as shown in FIG. 2, the resonance between $L_1$, $L_2$ and C will occur to pull up the link voltage. This variation will only change the resonant frequency of mode 3. In a practical implementation, any one of above two methods of diode connection can be used.

Figure 9:
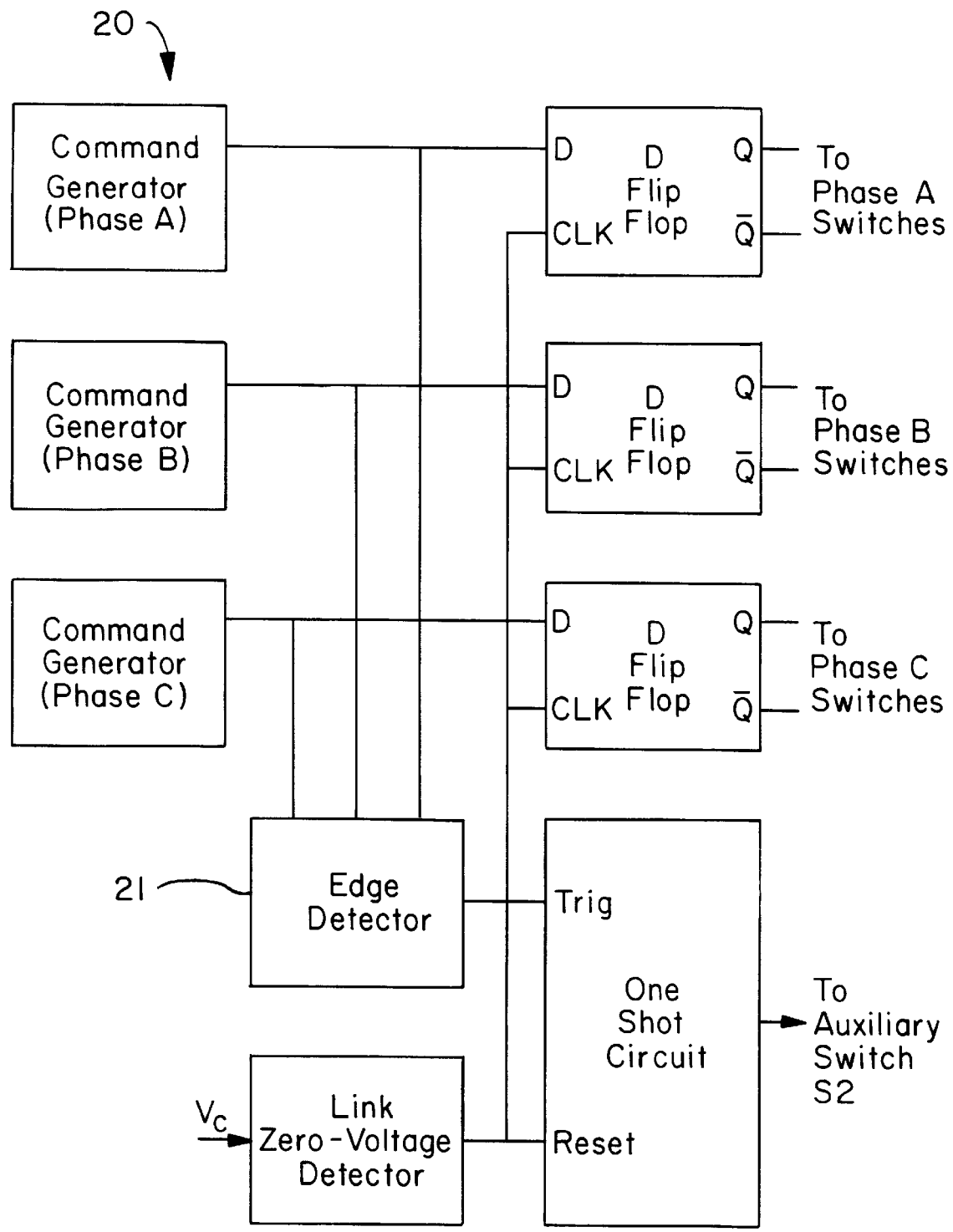
FIG. 9 is a block diagram of the control circuit for controlling operations of the DC to AC converter of the present invention.

As best shown in FIG. 9, the control of the converter 10 is implemented based on the DC link operation requirements, that is, whenever a switching is commanded, the auxiliary switches $S_1$ and $S_2$ must first be turned on to initiate a resonant transient. When the link voltage reaches zero, the output inverter 11 switches. The control circuit 20 is applicable to most of the modulation schemes, including PWM. An edge detector 21 detects the desired state change before the switching command is passed to the inverter switches $T_1$–$T_6$. The detected edges are used to trigger the turn-on of the DC link 12, while the switching command is synchronized with the link zero voltage condition to ensure zero voltage switching.

The topology of the present invention realizes a stable resonant link mode having $V_c=V_s$ and $i_f=I_o$ (pseudo-steady state mode $M_o$). This fact suggests that it is possible to keep a desired inverter switch state (or output voltage vector) for any desired period of time, leading to a true PWM capability.

From the basic waveforms shown in FIG. 8, it is seen that some limitations still exist, as also observed in other quasi-resonant topologies presented in the literature. That is, a finite amount of time is required to build up certain conditions in the resonant circuit, and no inverter switchings can take place during this time. This period is usually associated with the storage of a minimum energy in the resonant circuit to guarantee proper operation, and it is normally a function of the load current. In the PCQRL inverter topology, such a period of time is related to the reset of the inductor $L_1$, corresponding to the clamping period (mode $M_4$). In FIG. 8, it is seen that during the clamping period the inverter switches $T_1$–$T_6$ cannot change state, and it is not possible to drive the DC link voltage $V_c$ down to zero by triggering the auxiliary switches $S_1$ and $S_2$. This fact limits the range of the modulation index in which PWM operation can be obtained. Such a limitation is minimized if the inverter switching period remains roughly 20 times larger than the clamping interval.

Any modulation or drive control strategy that implies fixed or variable frequency operation can be implemented, provided the limitations stated above are respected. Delta modulators with fixed switching frequency, for instance, can be easily implemented with this topology. In this case, the clamping interval limits the maximum switching frequency.

Experimental tests have been performed on the PCQRL converter prototype supplying AC power to a three phase induction machine 22. A constant Volts/Hertz scheme was adopted and a sigma-delta modulator with a sampling frequency of 20 kHz was employed. The results were obtained with the converter prototype driving a 3HP, 230V three phase induction machine 22 under rated load with a converter DC link voltage equal to 335V, slightly higher than the rated value (320V).

Figure 10A:
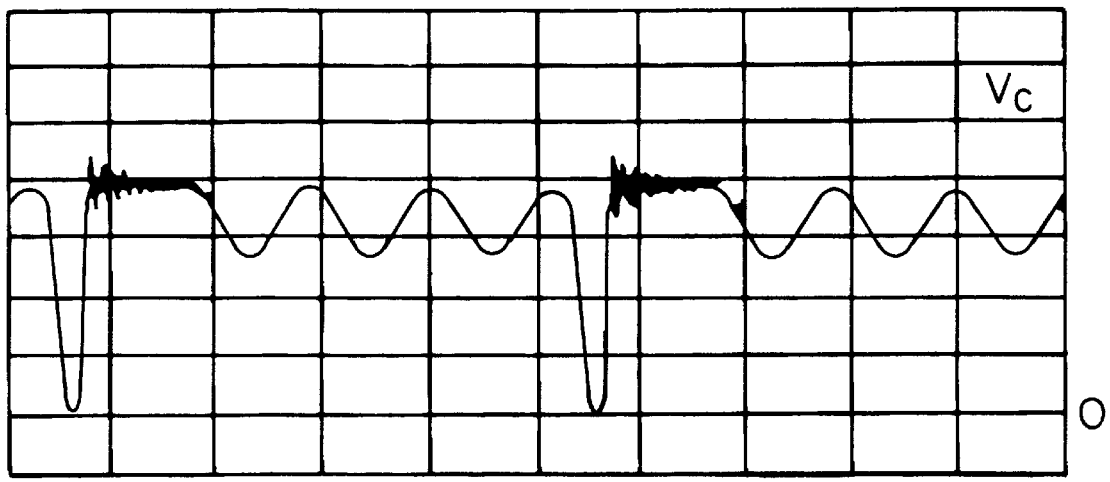
FIGS. 10 A–B are diagrams of waveforms of the DC link obtained experimentally for a clamp factor of 1.25.
Figure 10B:
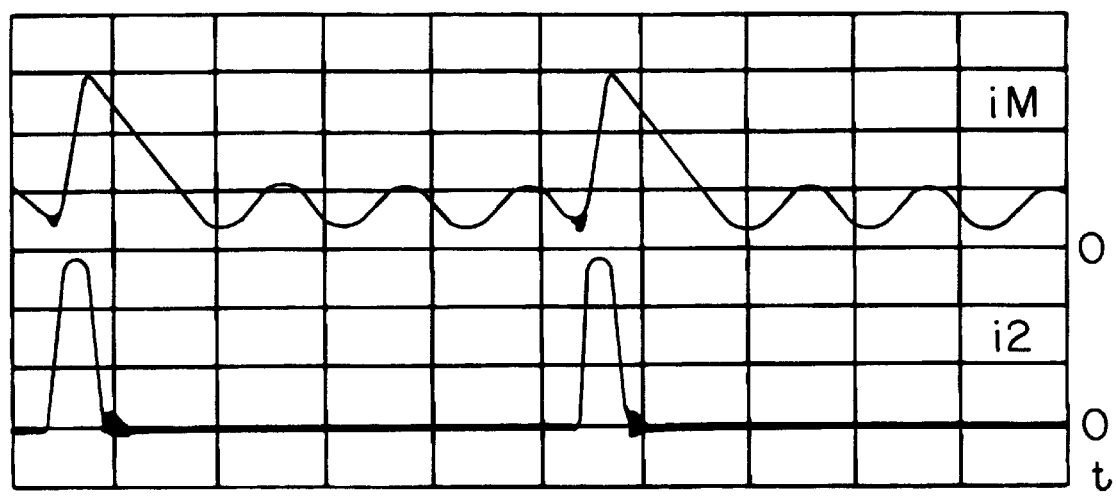

FIGS. 10 A–B shows the DC link waveforms: link voltage ($V_c$), DC bus current ($i_M=i_1-i_3$) and the auxiliary inductance current ($i_2$), from top to bottom, respectively. It is seen that a clamping factor close to 1.25 has been achieved. Although the clamping transformer was designed to have a clamp factor equal to 1.2, the clamp action cannot take place immediately after link voltage reaches $1.2V_s$ due to the presence of the leakage of the clamping transformer. In practice, the clamping process is characterized by a ringing caused by the resonance between the transformer leakage inductance and the resonant capacitor C. Thus, for a lower clamp factor, a lower leakage or a larger turns ratio transformer should be used (as discussed above).

Figure 11A:
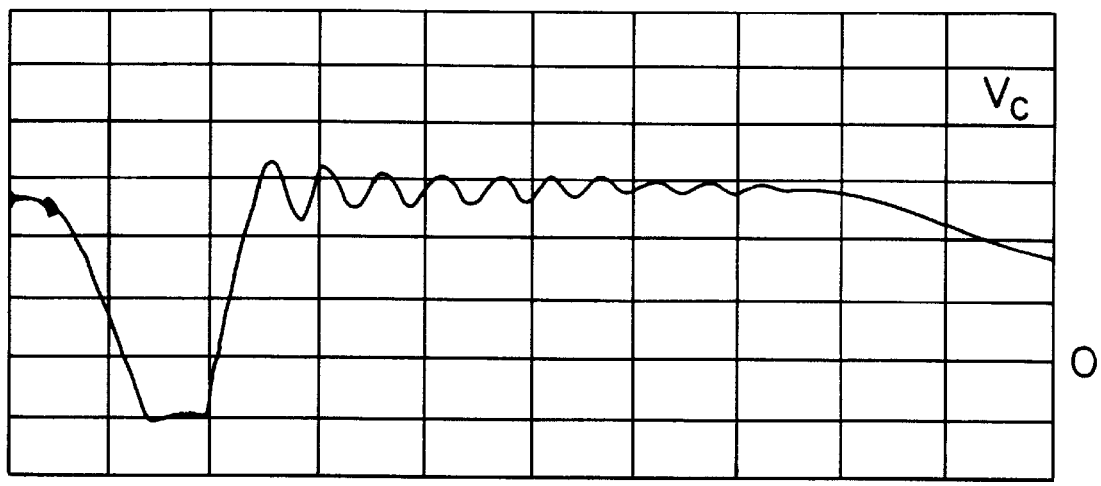
FIGS. 11 A–B are more detailed diagrams of the same waveforms depicted in FIGS. 10A–B.
Figure 11B:
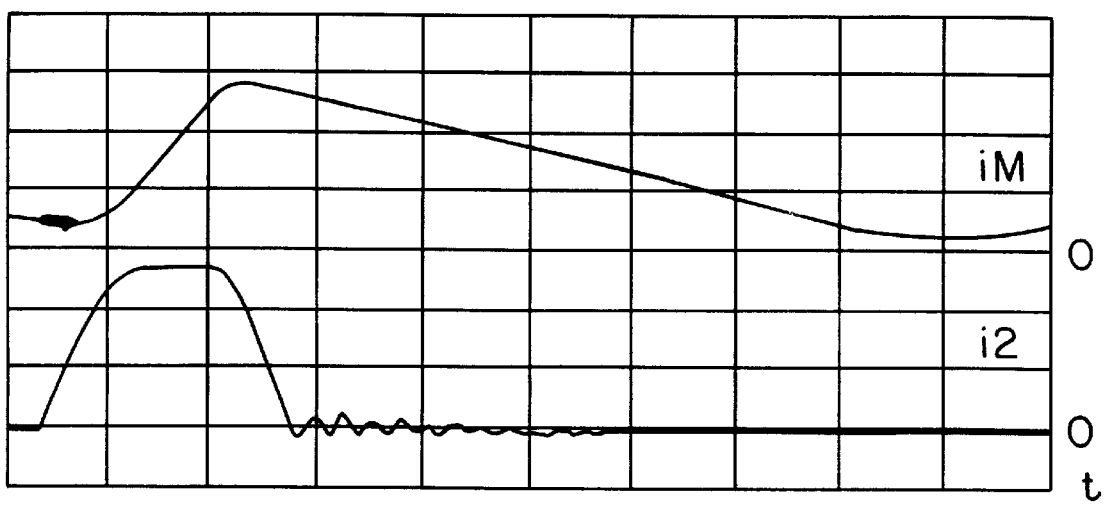

FIGS. 11 A–B shows a more detailed view of the same resonant link waveforms depicted in FIGS. 10 A–B. All the waveforms are in good agreement with the simulation results (as discussed below). The ringing of the auxiliary inductor current waveform ($i_2$) is caused by reverse recovery of the feedback auxiliary diodes $D_1$ and $D_2$.

Although the topology requires two additional switches $S_1$ and $S_2$, to realize resonance control, the current ratings of those two switches are very small which is determined only by the DC bus voltage $V_s$, link capacitor C, and inductance $L_1$ and $L_2$ (only 30A peak current is required). Another important feature is that the currents ratings of the auxiliary switches $S_1$ and $S_2$ are independent of converter load current which makes this topology attractive for high power applications. A reduction of auxiliary switch count from two to one is also possible (as discussed below).

Figure 12A:
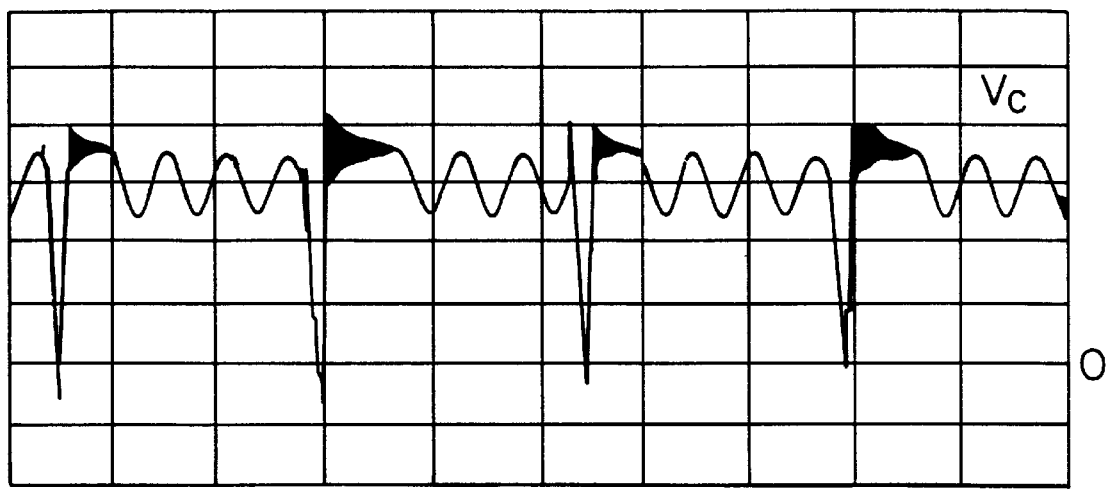
FIGS. 12 A–B are diagrams of DC link and output voltage waveforms obtained experimentally.
Figure 12B:
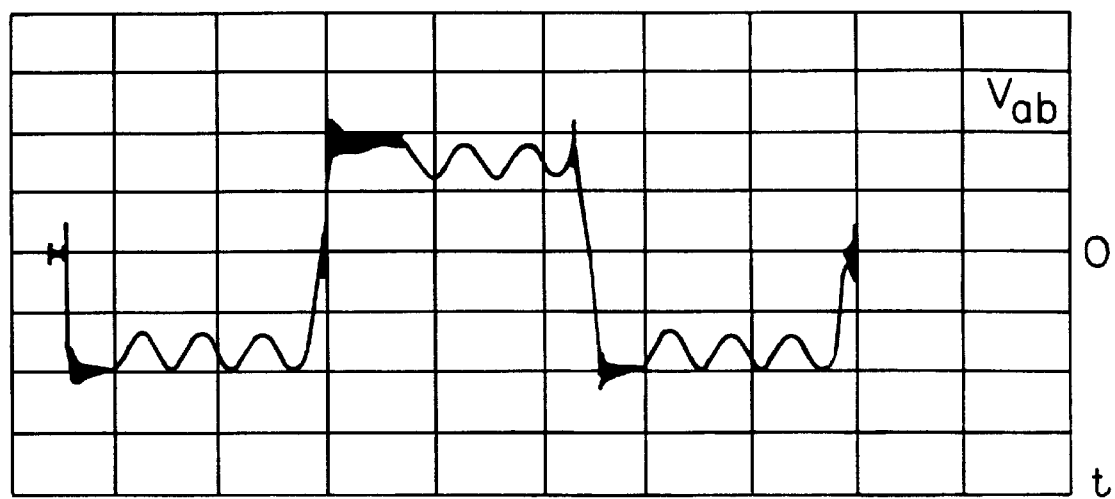
Figure 13A:
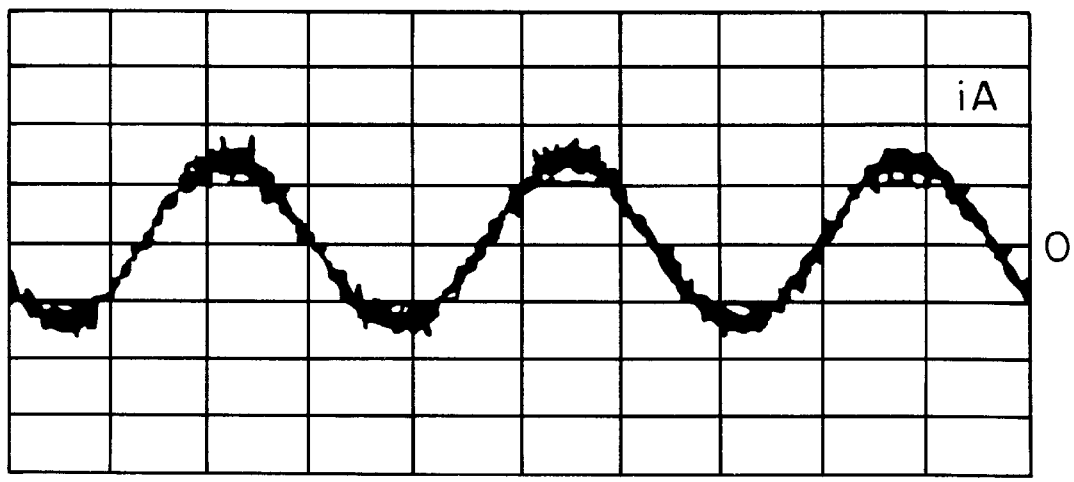
FIGS. 13 A–B are diagrams of load current and output voltage waveforms obtained experimentally.
Figure 13B:
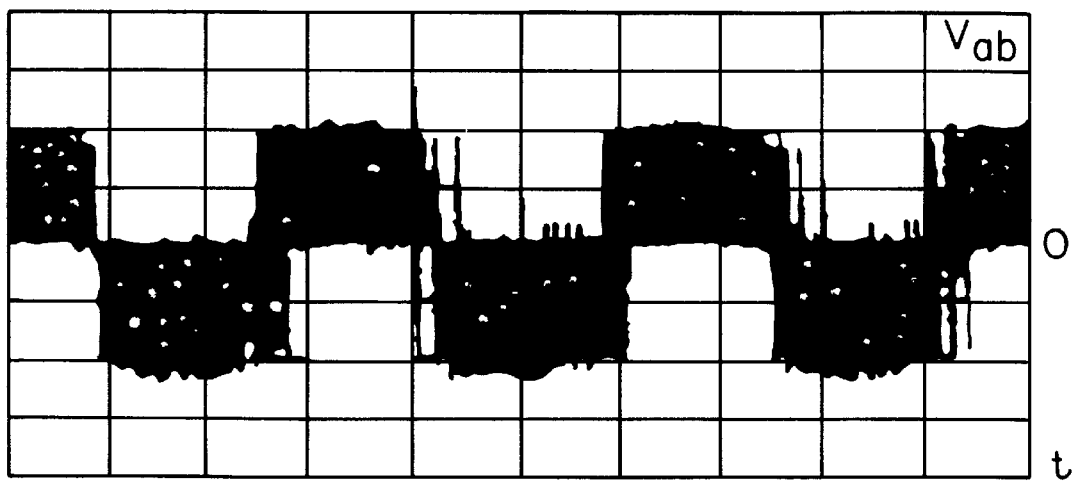

FIGS. 12 A–B shows DC link and output line-to-line voltages, from top to bottom. The synchronism between the zero voltage instants at the DC link and the inverter switching is clearly seen, and soft switching is achieved. Output voltage and current are shown in FIGS. 13 A–B. The output line-to-line voltage and load current waveforms have a fundamental frequency close to 60 Hz. It is observed that these waveforms are almost the same as a hard switched converter operated under the same conditions.

Analyses and tests performed revealed the following advantages of the topology of the present invention.

It has been observed that the choice of the resonant link parameters L1, L2 and C heavily influence the peak current stress in inductor $L_1$ and $L_2$. Thus, it is possible to minimize the inductor peak current by proper choice of link parameters based on specific inverter design specification. It is seen that the duration of mode 1 and 3, i.e. M1 and M3, is solely determined by the resonant frequencies and the relative value of $L_1$ and $L_2$. So are the peak currents of $L_1$ and $L_2$ given the same Vs. This means that the resonant or AC current component in inductors is load independent, which is determined only by DC source voltage, link inductance $L_1$, $L_2$ and capacitance C. It is important that the current of inductor $L_1$ during mode 1 can be controlled to be almost constant by choosing an appropriate ratio of $L_2$ to $L_1$. Due to this phenomenon, the current handling characteristic of inductor $L_1$ is almost the same as in a conventional PCRL inverter.

Because this invention is a quasi-resonant or resonant transition circuit, link resonance is activated only when a PWM switching is commanded. The resonance takes only a very small duration of an average PWM switching cycle. As a result, one apparent advantage over previous resonant DC link converters is that the voltage-second balance of the resonant inductor $L_1$ can be easily met and thus a small clamp factor of 1.1–1.3 can be implemented.

Another advantage is that the resonance frequency is decoupled from the link frequency which is proportional to the inverter switching frequency based on the modulation method. It is possible to design a high resonant frequency while maintaining a low PWM switching frequency. The benefits are that the low PWM switching frequency will further decrease the inverter switching losses and the high resonant frequency can be realized using very small resonant LC components. Thus, the resonant energy involved is also reduced considerably. Due to the decoupling of the switching frequency from the resonant frequency, any of numerous PWM modulation strategies can be used to synthesize the inverter output voltage waveforms, for example harmonic elimination, sine-triangle modulation or space vector modulation, as discussed, for example, in J. M. D. Murphy and F. G. Turnbull, "Power Electronic Control of AC Motors" Pergamon Press, 1988, and P. Van, "Vector Control of AC Machines", Clarendon Press, Oxford, 1990.

One of the key advantages of this circuit, in addition to its PWM capability and low device rating performance, is that the introduction of the auxiliary inductor also eliminates the energy balance control loop of the conventional resonant link converter. Link voltage return-to-zero, which remains a major control issue in the conventional converters, becomes an inherent mechanism for this combined parallel and serial LC resonant circuit structure.

In summary, the new topology, in addition to its preservation of the ruggedness and high power handling capacity of the passively clamped structure, reduces considerably the voltage ratings of inverter switches from more than 2 per unit to 1.1–1.3 per unit. PWM capability is realized and link resonance control simplified. The peak current of resonant inductors is also reduced with respect to the conventional resonant DC link converters. The penalty in terms of more components in the topology is well justified by its small ratings and considerable gains in overall inverter performances.

As discussed above, the experimental results are in good agreement with simulation analyses which has been performed to produce a constant link frequency at 20 KHz and a constant DC link load current $I_o$ of 50A (the converter parameters are included in Table 2).

Figure 14A:
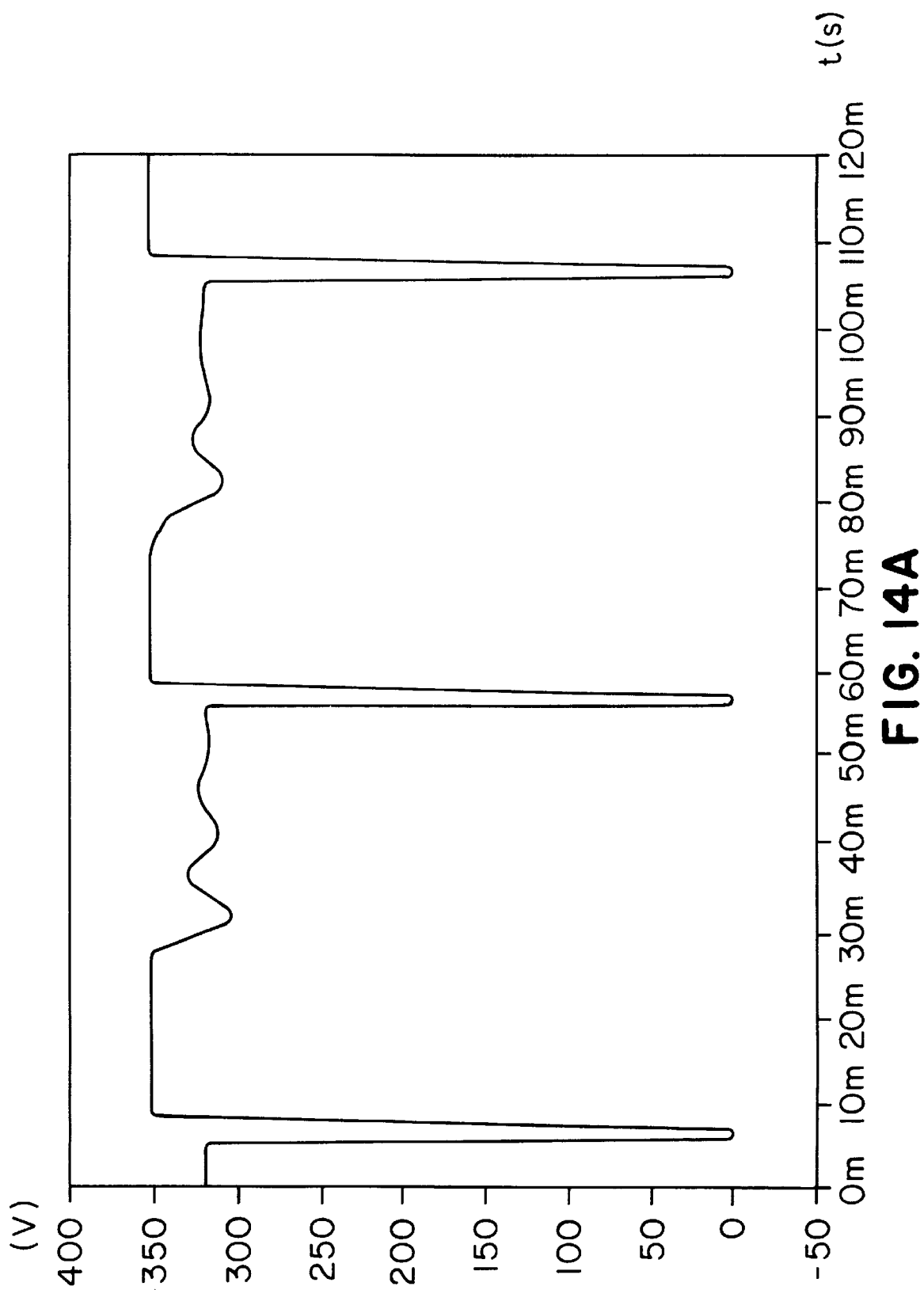
FIGS. 14 A–C are simulation diagrams of the link voltage and current waveforms for clamp factor 1.1.
Figure 14B:
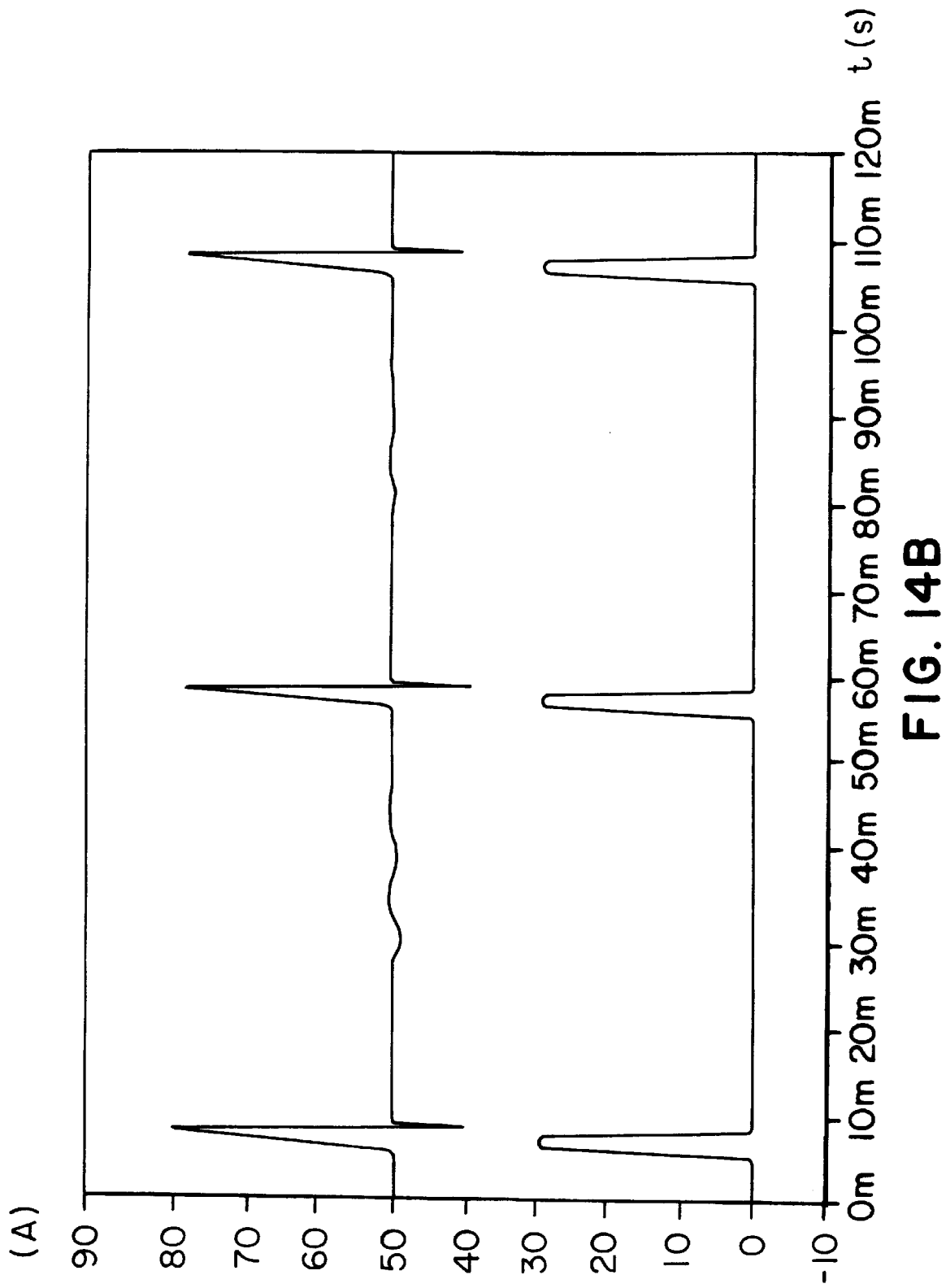
Figure 14C:
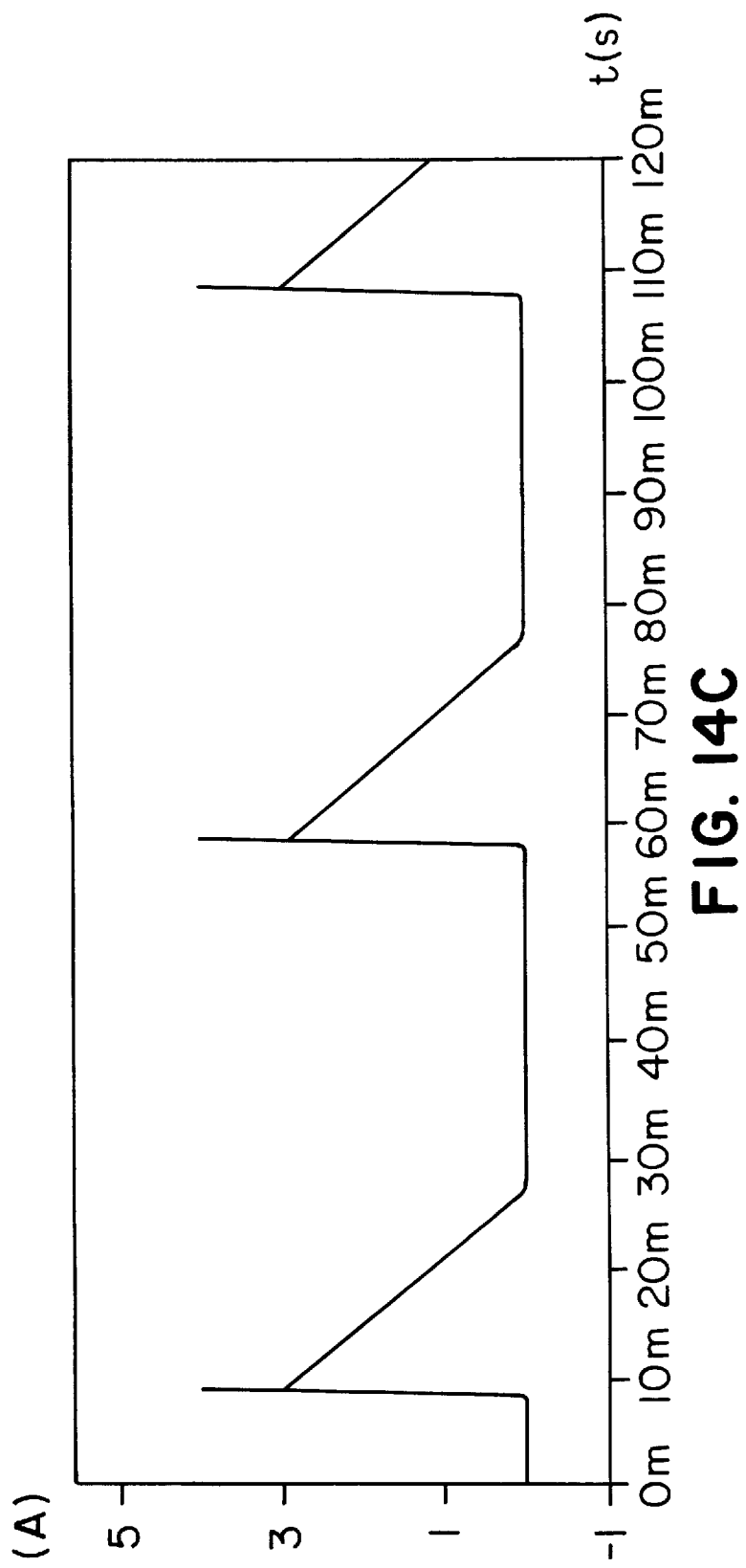

The link voltage and current waveforms are plotted in FIGS. 14 A–C. It can be seen that the peak current i2 of $L_2$ is about 30A which is quite small and load independent. The current waveform of the main resonant inductor $L_1$ is almost the same as in a conventional LC resonant link converter, however, with a much smaller peak AC component than of the conventional converters. The peak clamp winding current is about 5A to K equal to 1.1.

The resonant current components in $L_1$ and $L_2$ depend on Vs, the resonant frequency and the ratio of L1 and L2 only. They are thus load independent which means that no matter how large the DC link load current $I_o$ will be, the peak inductor current $i_1$ will still be 30A and the peak current i1 will still be $I_o$ plus 30A. The feature of utilizing resonant energy independent of load conditions makes the topology very attractive for high power and high load current applications.

Figure 15A:
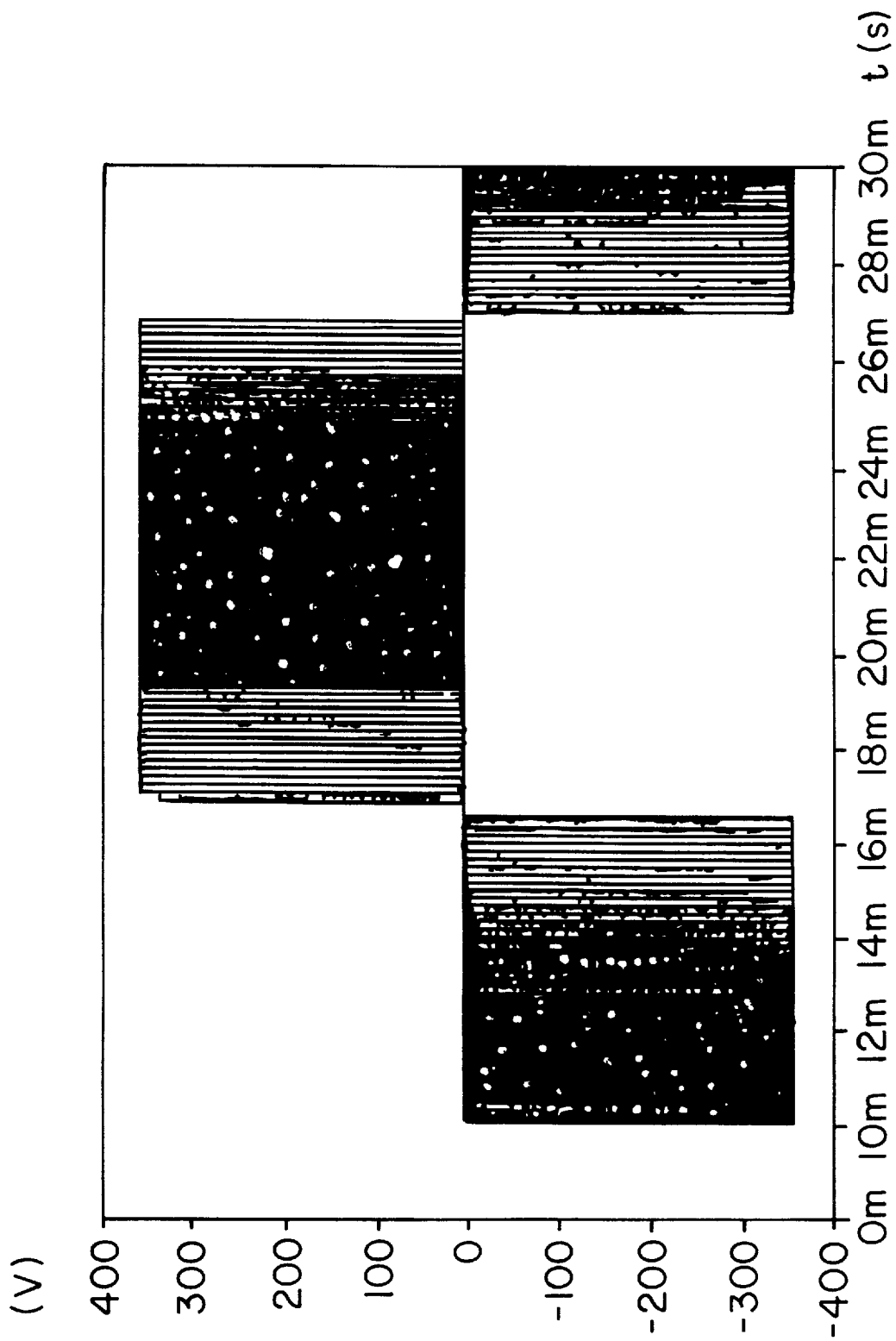
FIGS. 15 A–B are simulation diagrams of the output line-to-line voltage and three-phase load current waveforms for a clamp factor of 1.1.
Figure 15B:
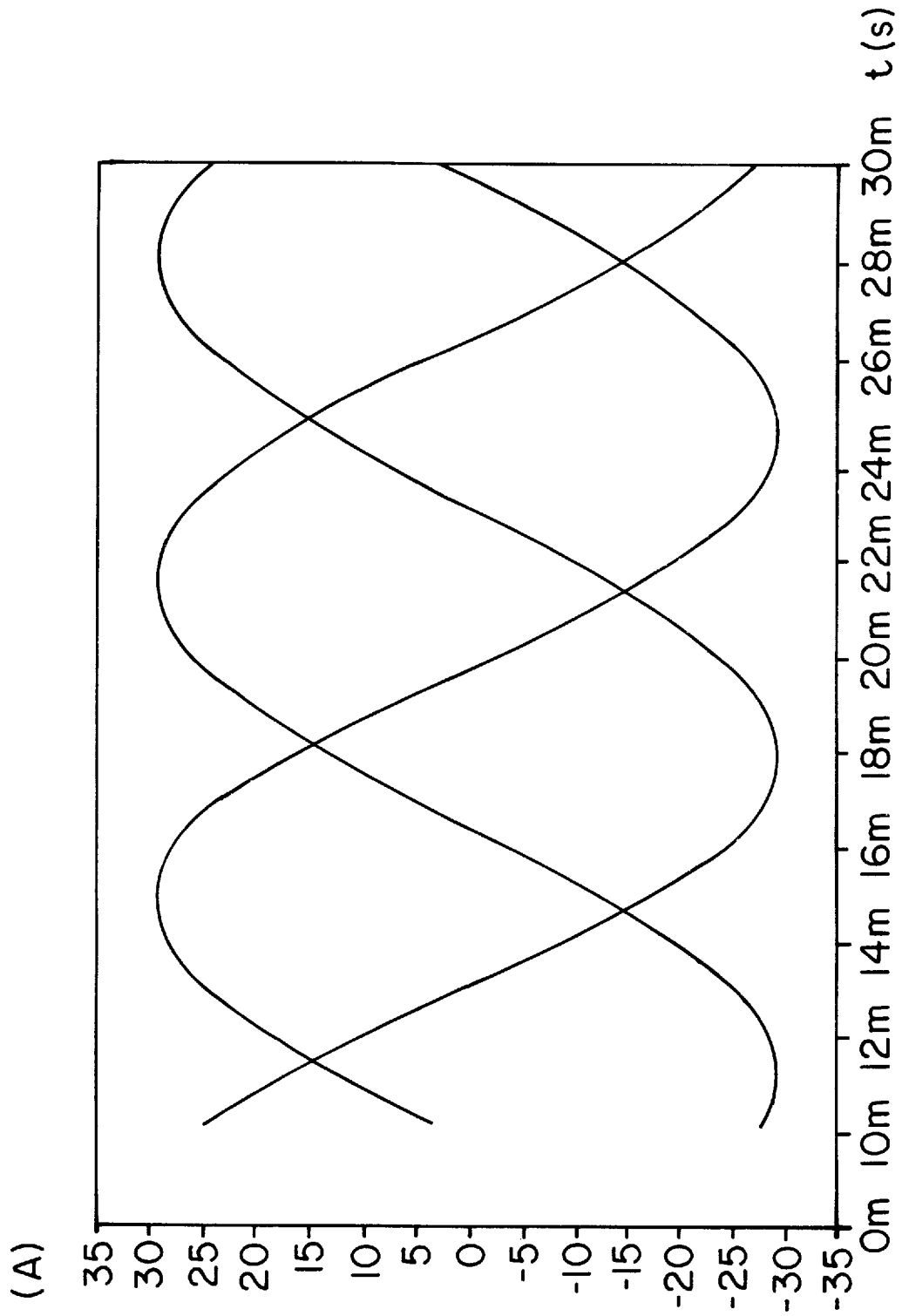

A three phase sinusoidal PWM modulation was then implemented to control the operation of a 15 KW converter. A wye-connected three phase load with R=5 Ohms and L=6.67 mH is connected to the converter. The triangle reference frequency of the sinusoidal PWM modulation is 6 kHz. The output line to line voltage and load current waveforms are presented in FIGS. 15 A–B.

TABLE 2

Converter Parameters

| | |
|---|---|
| Inductor $L_1$ | 20 µH |
| Inductor $L_2$ | 8 µH |
| Capacitor C | 60 nF |
| DC Source Vs | 320 V |
| Clamp Factor K | 1.1 |
| IGBT Pull-Down Time = T1 | 1.5 ms |
| IGBT Storage Time = T2 | 1.0 ms |
| IGBT Pull-Up Time = T3 | 1.5 ms |

Obviously, many modifications may be made without departing from the basic spirit of the present invention.

Figure 3:
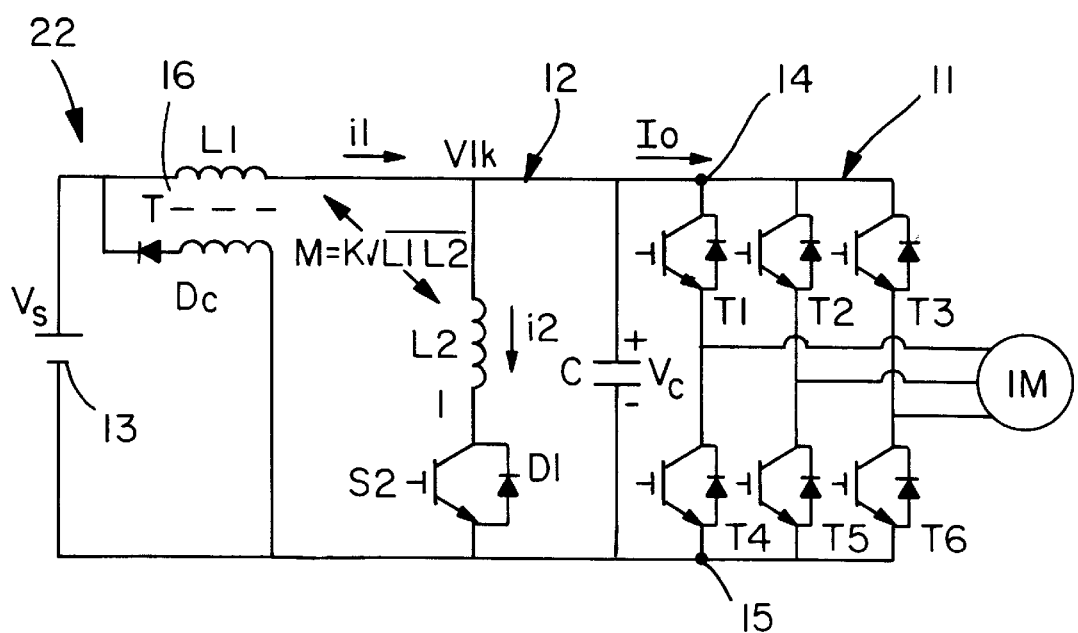
FIG. 3 is a schematic diagram of another, simplified embodiment of the DC to AC converter of the present invention.

For example, and as best shown in FIG. 3, in an alternative embodiment the converter 23 of the present invention features a reduction of the auxiliary switch count from two to one. This reduction is made possible by mutual coupling between the inductors $L_1$ and $L_2$. The operational mode and operational principles of the converter 23 are similar to the converter 10 shown in FIG. 2, except that the mutual coupling of L1 and L2 will cause the current in inductor $L_2$ to become reversible. When the inductor L2 is switched on, the current in the inductor will increase and then become reversed. Once the current reverses, the auxiliary switch is then turned off in a zero voltage mode.

As link voltage clamping and inductor $L_2$ conducting happen at different time slots, it is possible to make the inductor $L_2$ share the same magnetic core with the inductor $L_1$. Thus, it considerably reduces the device cost and provides a minimum device count.

Figure 4:
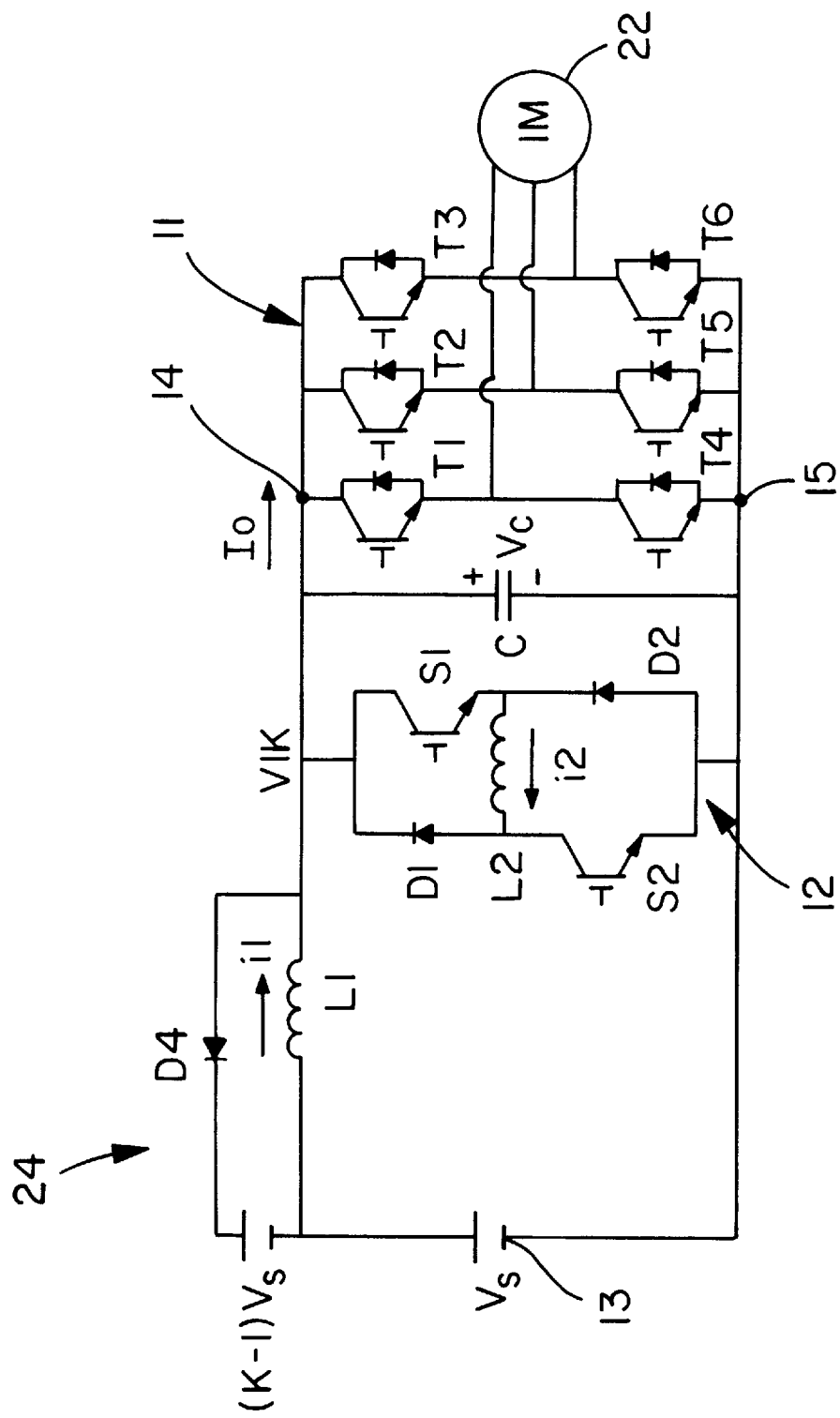
FIG. 4 is a simplified schematic diagram of yet another embodiment of the DC to AC converter of the present invention with a clamp diode.

Yet another embodiment of the present invention is shown in FIG. 4 as a converter 24. While a transformer based passive clamp is used to provide the link voltage limitation (as shown in FIG. 2) the circuit can be simplified as shown in FIG. 4. The secondary of the passive clamp transformer is replaced by a low voltage DC source with a voltage of (K-1)VS and a clamp diode $D_4$. In a low DC voltage case (small Vs), the clamp can even be realized using only diodes since the excess clamp voltage (K-1)Vs may become equal to the forward drop voltage of a few diodes.

Accordingly, it will be appreciated by those skilled in the art that within the scope of the appended claims, the invention may be practiced other than has been specifically described herein.

We claim:

1. A converter for providing a regulated AC output power from a DC power source to a load, comprising:

(a) an output inverter having a pair of first and second input terminals and a plurality of inverter switches;

(b) a passively clamped quasi-resonant DC link coupled between the DC power source and the input terminals of the output inverter, and controllable so as to minimize switching losses of the output inverter, the DC link comprising:

a clamp transformer having a certain turns ratio and including a primary magnetizing inductance connected in series with the DC power source and serving as a resonant inductance and a secondary connected in parallel to the DC power source and serving as a clamp winding, the clamp transformer having a means for leakage inductance control, a capacitor coupled between the input terminals of the output inverter, an auxiliary inductance, and at least one auxiliary switching means connected in series with the auxiliary inductance, wherein the auxiliary switching means in series with the auxiliary inductance, respectively, are coupled in parallel with and between the input terminals of the output inverter; and (c) a controlling means for gating said at least one auxiliary switching means, such that once a switching of at least one of the inverter switches is commanded, said at least one auxiliary switching means must first be turned "ON" to initiate a resonant transient and to cause a link voltage to reach zero, thereby causing commanded switching of the output inverter.

2. The converter of claim 1, wherein in order to reach a clamp factor not higher than 1.2, the turns ratio of the clamp transformer equals 1:5.

3. The converter of claim 1, wherein the means for leakage inductance control includes a co-axial arrangement of windings of the primary magnetizing inductance and the secondary of the clamp transformer, respectively.

4. The converter of claim 3, wherein the winding of the primary magnetizing inductance is an outer part while the winding of the secondary is the inner part of the co-axial arrangement thereof.

5. The converter of claim 1, wherein the means for leakage inductance control includes a winding splitting arrangement.

6. The converter of claim 1, wherein the auxiliary inductance has first and second ends, and wherein the DC link further includes another auxiliary switching means connected in series between the first end of the auxiliary inductance and the second input terminal of the output inverter, wherein said at least one auxiliary switching means is connected between the second end of the auxiliary inductance and the first input terminal of the output inverter, and wherein said at least one and said another auxiliary switching means are driven by the same gating signal from said controlling means.

7. The converter of claim 6, further including first and second auxiliary diodes, the first auxiliary diode being connected in opposite parallel arrangement with said at least one auxiliary switching means between the first end of the auxiliary inductance and the first input terminal of the output inverter, and the second auxiliary diode being connected in opposite parallel arrangement with said another auxiliary switching means between the second end of the auxiliary inductance and the second input terminal of the output inverter.

8. The converter of claim 1, wherein the load is a multi-phase load, wherein each of said plurality of inverter switches corresponds to a respective phase of the multi-phase load; and wherein the control means comprises:

a command generator for each of said respective phases, a plurality of logic bi-stable units, each receiving commands from a respective one of said command generators and being connected to said inverter switches of the respective phase, an edge detector detecting a desired state change before a switching command is passed to the inverter switches of the respective phase and triggering the "Turn-ON" of said at least one auxiliary switching means once the desired state change has been detected, and a link zero-voltage detector detecting a link zero-voltage condition and outputting the signal to a respective one of said plurality of logic bi-stable units, thereby synchronizing the switching command with the link zero-voltage condition to ensure zero-voltage switching.

9. The converter of claim 1, wherein the secondary of the clamp transformer includes a clamp diode.

10. The converter of claim 1, wherein the output inverter includes a plurality of parallely connected pairs of first and second inverter switches, and wherein the regulated AC output power is supplied to the load from a junction between said first and second inverter switches in each pair thereof.

11. A converter for providing a regulated AC output power from a DC power source to a respective phase of a multi-phase load, comprising:

an output inverter having first and second input terminals and a plurality of parallely connected first and second inverter switches, each pair corresponding to a respective phase; and a passively clamped quasi-resonant DC link coupled between the DC power source and the output inverter and being controllable by a controlling means so as to minimize switching losses of the output inverter, the DC link comprising:
(a) a clamp transformer with reduced leakage inductance and providing a clamp factor not higher than 1.2 by arranging a turns ratio between primary and secondary windings thereof equals to 1:5;
(b) a capacitor;
(c) an auxiliary inductance having first and second ends;
(d) first and second auxiliary switching means, driven by the same gating signal; and
(e) first and second auxiliary diodes;
 wherein the first auxiliary switching means is connected between the second end of the auxiliary inductance and the first input terminal of the output inverter;
 wherein the second auxiliary switching means is connected between the first end of the auxiliary inductance and the second input terminal of the output inverter;
 wherein the first auxiliary diode is connected in opposite parallel arrangement with said first auxiliary switching means and between the first end of the auxiliary inductance and the first input terminal of the output inverter;
 wherein the second auxiliary diode is connected in opposite parallel arrangement with the second auxiliary switching means between the second end of the auxiliary inductance and the second input terminal of the output inverter; and
 wherein once output inverter switching has been commanded, the first and second auxiliary switching means are turned "ON" to initiate a resonant transient and to cause a link zero-voltage condition, and the switching command is accomplished in precise synchronization with the link zero-voltage condition.

* * * * *